US006926170B2

(12) United States Patent
Groesbeck

(10) Patent No.: US 6,926,170 B2
(45) Date of Patent: Aug. 9, 2005

(54) DRINK DISPENSING CART AND WATER PACKAGING AND SUPPLY SYSTEM

(76) Inventor: R. Clay Groesbeck, 4206 Mt. Olympus Way, Salt Lake City, UT (US) 84124

( * ) Notice: Subject to any disclaimer, the term of this patent is extended or adjusted under 35 U.S.C. 154(b) by 177 days.

(21) Appl. No.: 10/318,716

(22) Filed: Dec. 12, 2002

(65) Prior Publication Data

US 2004/0112917 A1 Jun. 17, 2004

(51) Int. Cl.[7] .......................... A47B 77/08; A47J 31/00

(52) U.S. Cl. .......................... 222/63; 222/66; 222/105; 222/129.1; 222/608

(58) Field of Search .......................... 222/63, 66, 105, 222/129.1, 129.2, 129.3, 129.4, 146.5, 146.6, 608, 609

(56) References Cited

U.S. PATENT DOCUMENTS 3,940,019 A * 2/1976 Kross et al. ............. 222/129.2
3,949,902 A * 4/1976 Thompson ............... 222/129.1
D264,214 S * 5/1982 Bowen et al. ............... D7/307
4,974,500 A * 12/1990 Boyd et al. ................... 99/279
5,154,317 A * 10/1992 Roppolo, III ................ 222/66
5,626,353 A 5/1997 Campbell
5,702,115 A * 12/1997 Pool ........................ 280/47.35
5,915,596 A * 6/1999 Credle, Jr. .................. 222/105
6,099,264 A * 8/2000 Du ............................ 417/300
6,143,258 A * 11/2000 Tamura et al. ............. 422/307

* cited by examiner

*Primary Examiner*—Kenneth Bomberg
(74) *Attorney, Agent, or Firm*—Mallinckrodt & Mallinckrodt

(57) ABSTRACT

A drink dispensing cart includes a drink dispensing machine that is normally plumbed directly into a municipal water pipe at a fixed location. The cart includes a container of water, preferably a disposable container of water such as a bag-in-box container of water, and a pump to pump water from the container of water to the drink dispensing machine. A controller controls operation of the pump to operate the pump only when water is needed by the drink dispensing machine and to provide an indication when the container of water is empty and needs changing. A pressure sensor in an outlet line extending between the pump and drink dispensing machine senses when water is needed by the dispenser and a pressure sensor in an inlet line extending between the pump and the container of water senses when the container of water is empty and needs replacing. A time delay circuit delays start of operation of the pump when water is needed by the drink dispenser to avoid pulsing of the pump. The bag-in-box container of water is sized for efficient packing and shipping.

20 Claims, 8 Drawing Sheets

DRINK DISPENSING CART AND WATER PACKAGING AND SUPPLY SYSTEM

BACKGROUND OF THE INVENTION

1. Field

Figure 1:
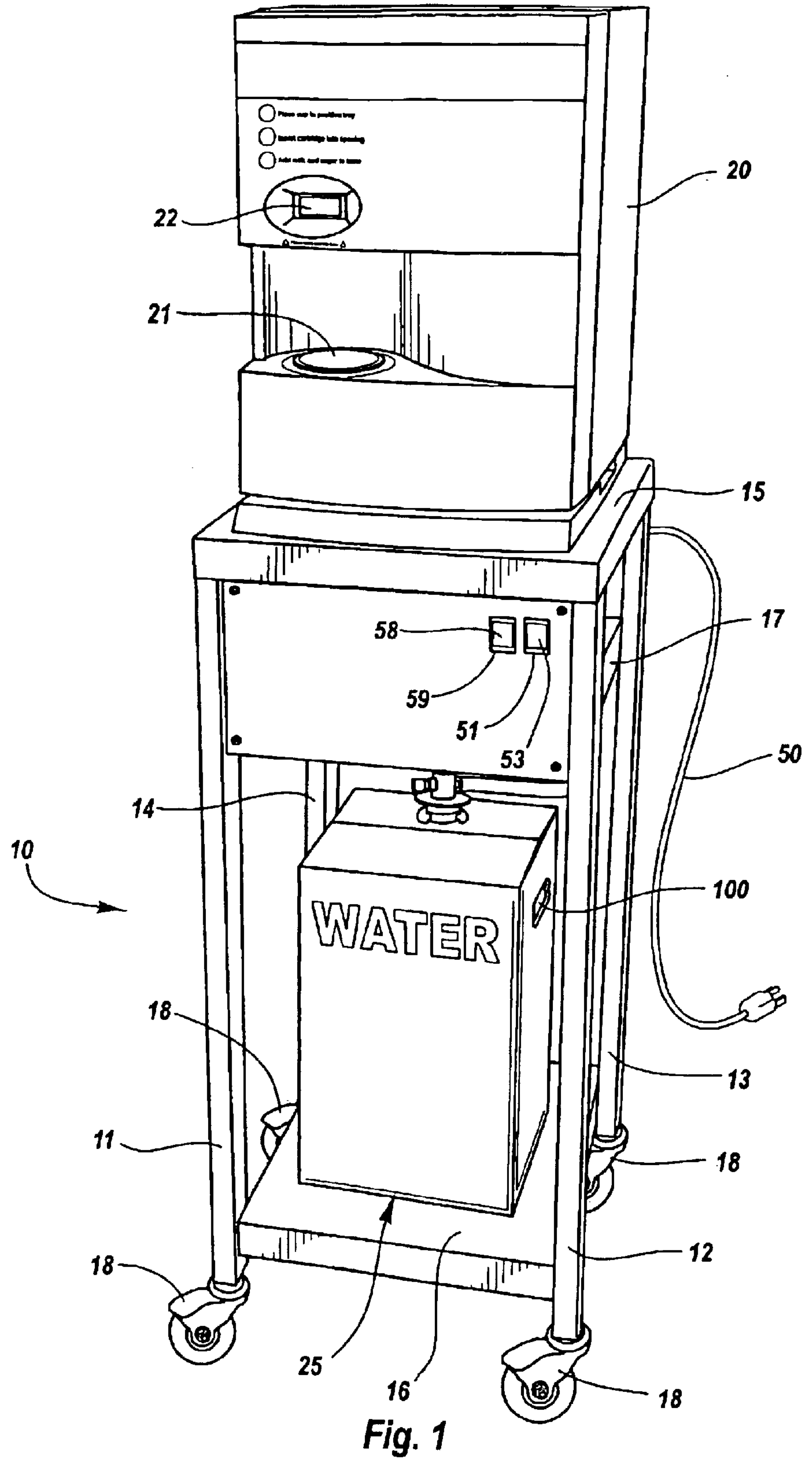

The invention is in the field of water dispensers and water based drink dispensers such as coffee, tea, and juice dispensers. It is also in the field of packaging and distributing bottled water.

2. State of the Art

Bottled water is normally supplied for use with water dispensers in offices or homes in substantially rigid, reusable five gallon bottles. The bottles may be glass, with the current trend to plastic. A water distribution company periodically delivers several five gallon bottles to the location of the dispenser and picks up empty bottles to transport back to the company for refilling. Full bottles are stored at the location of use until used, and empty bottles are stored until they are picked up. Storage of these bottles consumes space. Further, because the empty water bottles are picked up for refilling, the area of distribution for the water bottles by a particular water company is limited geographically to the area where delivery trucks can economically travel.

Single serve drink machines, such as coffee, tea, and juice dispensers, are popular and in wide use. These machines all require connection to both a source of power and a source of water. Connection to the source of water severely limits the location where such machines may be used since the machines need to be plumbed into the water supply pipes at the location concerned. This also means that such machines are stationary when installed.

There have been instances where stationary drink machines have been installed in a location where running water is not available and water has been supplied in the five gallon water bottles or larger drums filled with water. Water is pumped from the bottles or drums to the drink machines. Where these have been used, storage of the empty bottles until pick-up has been a problem.

SUMMARY OF THE INVENTION

According to the invention, water is packaged in plastic bags which bags are further packaged in cardboard boxes. This creates disposable packaging for the water so that recycling of the packaging is not required. This eliminates storage of empty water containers waiting for pick-up. Further, disposable containers of water, because of the elimination of the need to pick up the empty containers, can be shipped to users in a variety of ways. It is not necessary the containers be delivered by water company employees so delivery of the water is not limited to users within an area which can be serviced by the water company itself.

While the disposable containers can be used to supply water to fixed drink machine dispensers where municipal sources of plumbed water is not available, another aspect of the invention is a drink cart where the water supply and the drink dispensers are installed together on a cart which can be moved around to various locations. The carts will generally require connection to a source of electrical power, but do not need to be plumbed into a municipal water supply pipe. This allows significantly increased flexibility in locating drink dispensers.

A drink cart of the invention includes at least one drink machine such as a single serve coffee or juice machine designed to be connected directly to a pressurized source of water. The cart includes space for a container of water and a pump for pumping the water from the container to the drink machine. The cart preferably includes a pump control system to cause operation of the pump only when water is actually needed by the drink machine and to indicate when the container of water is empty and needs to be replaced with a new container. The control system preferably includes a time delay circuit to delay initiation of pump operation when water is needed by the drink machine to avoid rapid on and off pulsing of the pump.

THE DRAWINGS

Figure 2:
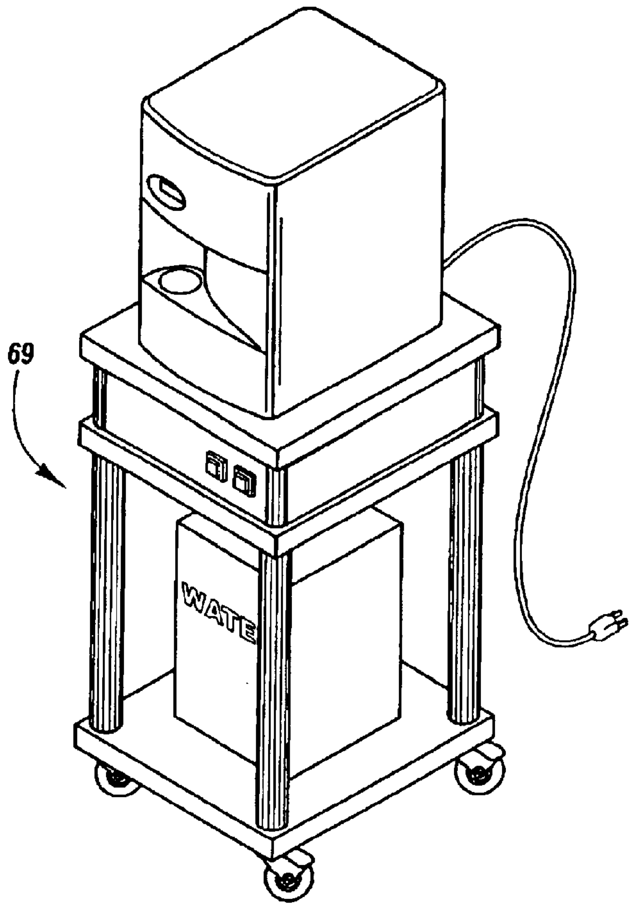
Figure 3:
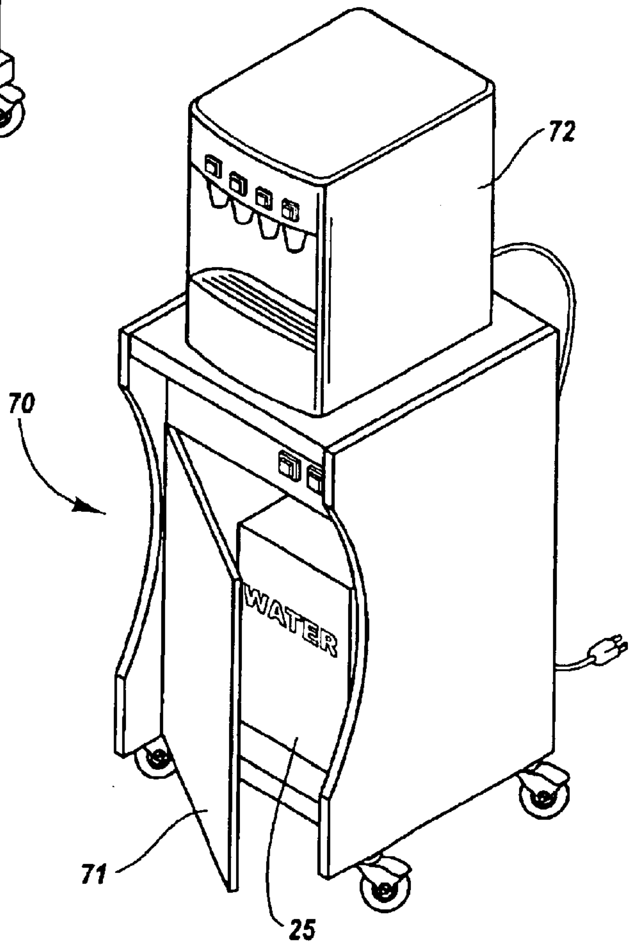
Figure 4:
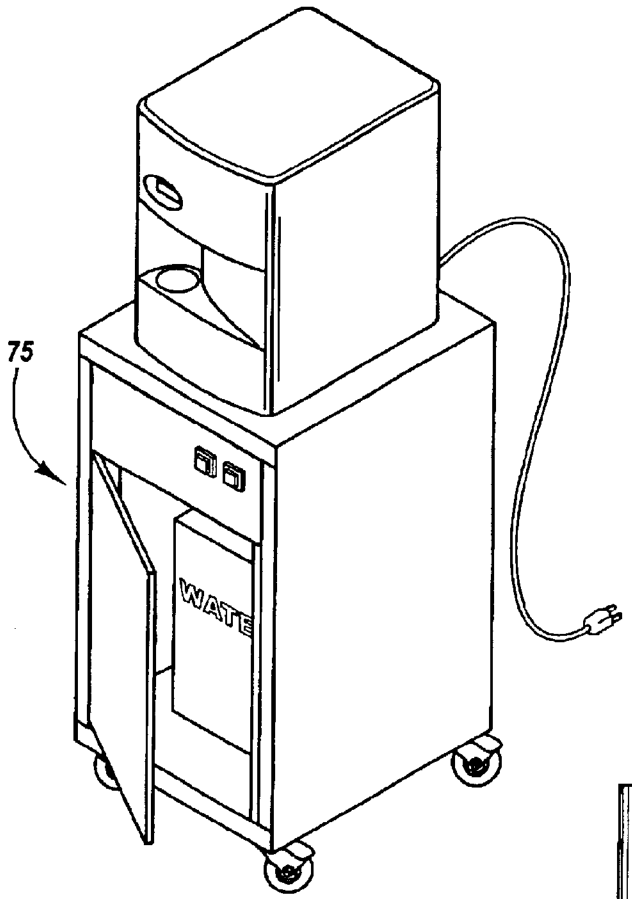
Figure 5:
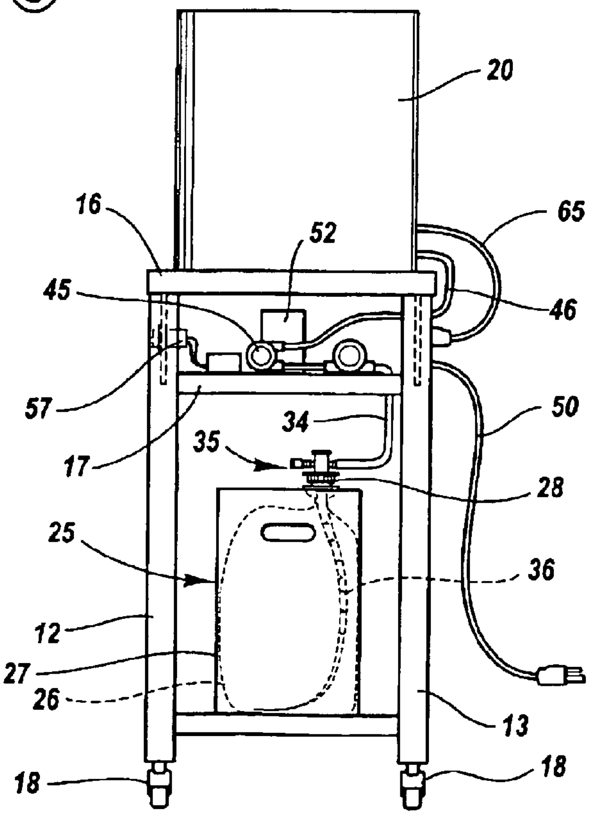
Figure 6:
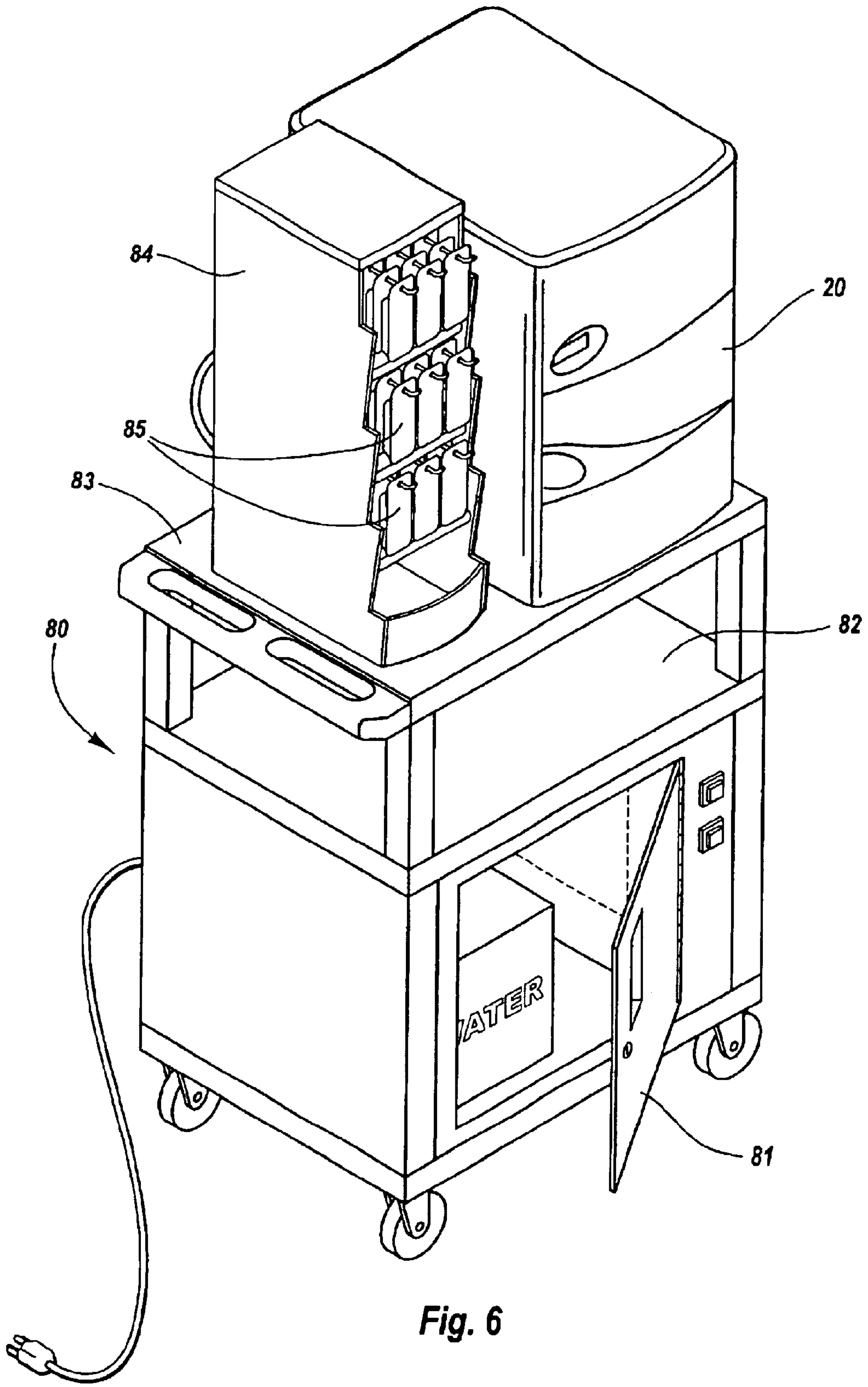
Figure 7:
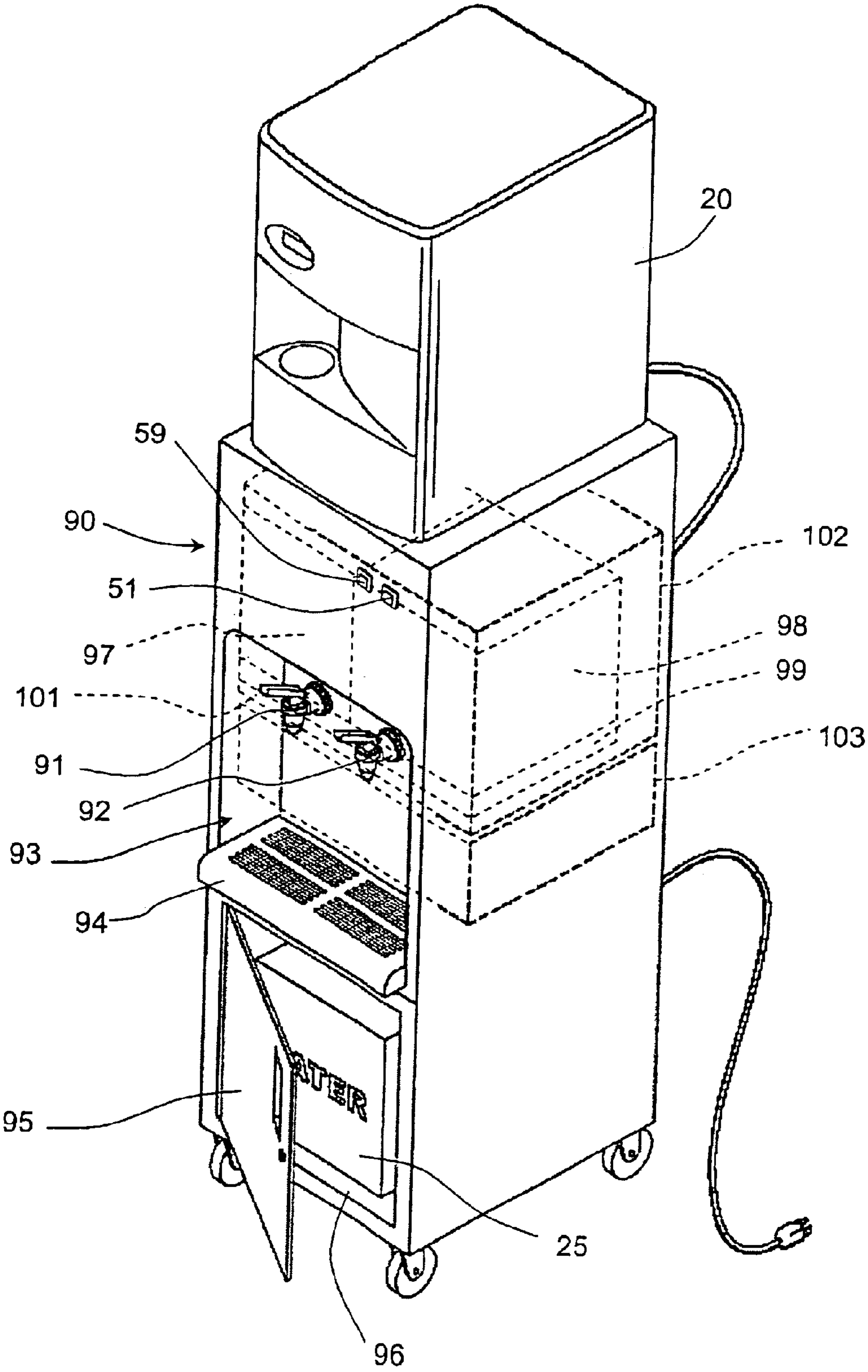
Figure 8:
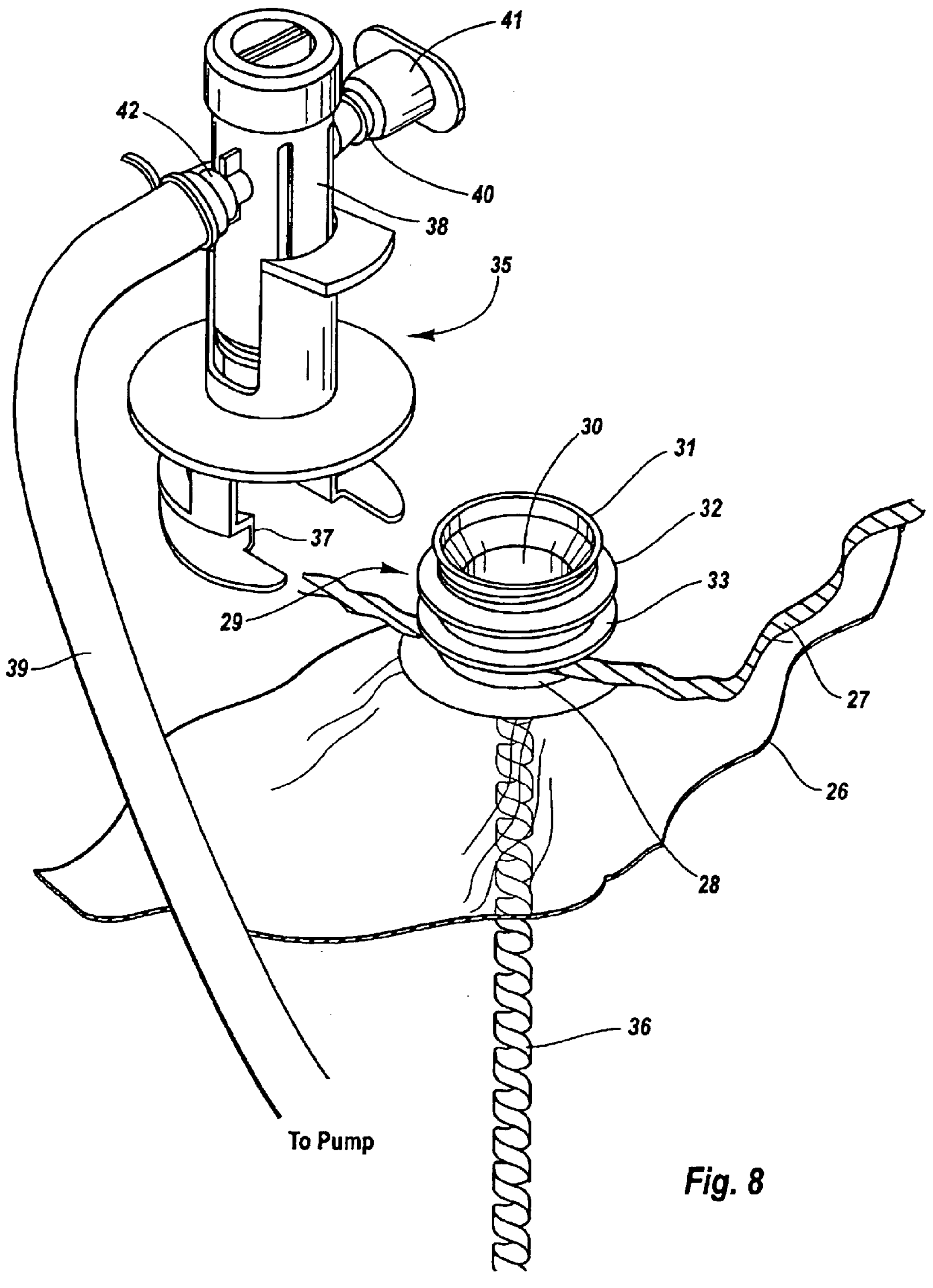
Figure 9:
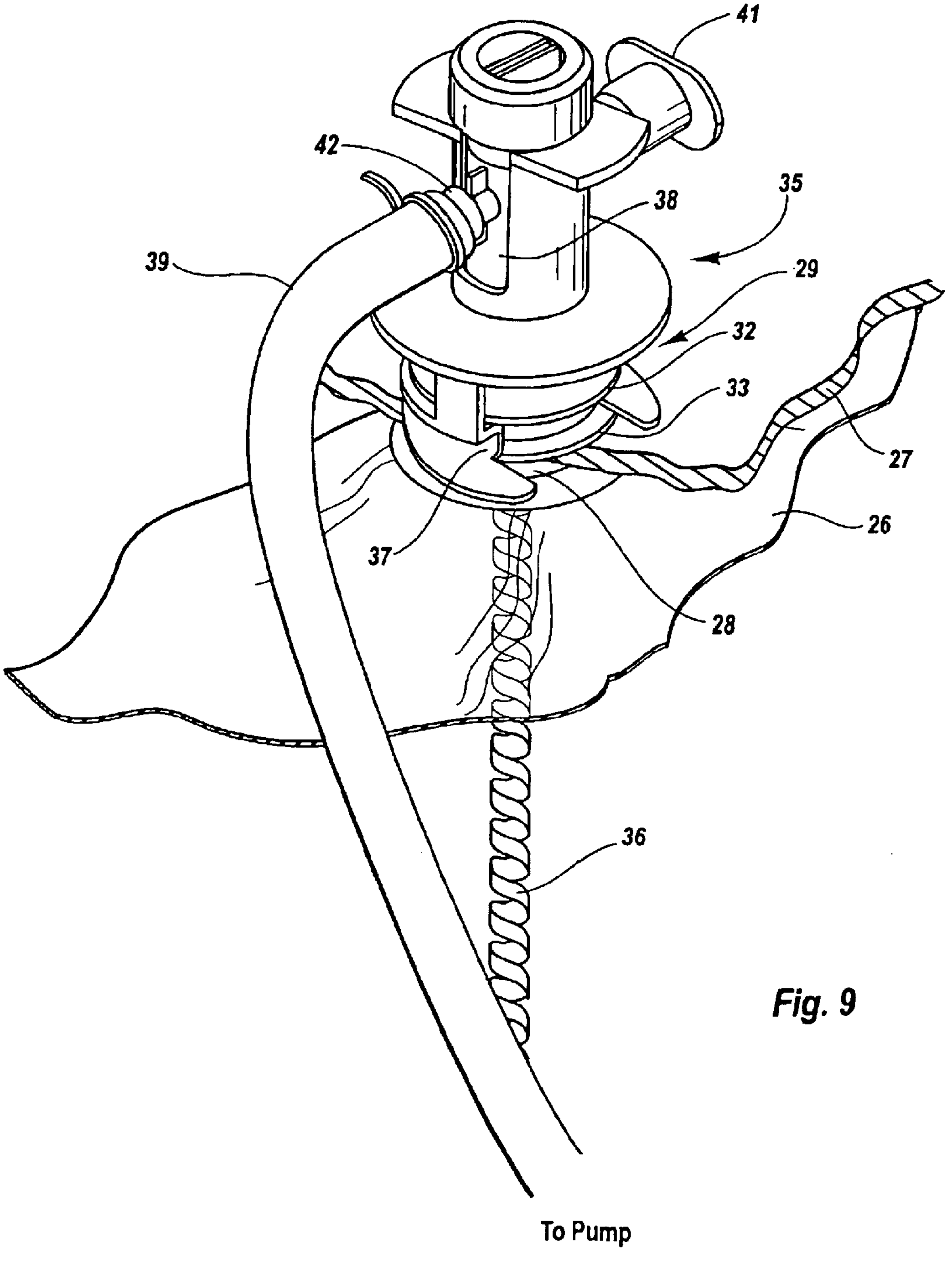
Figure 10:
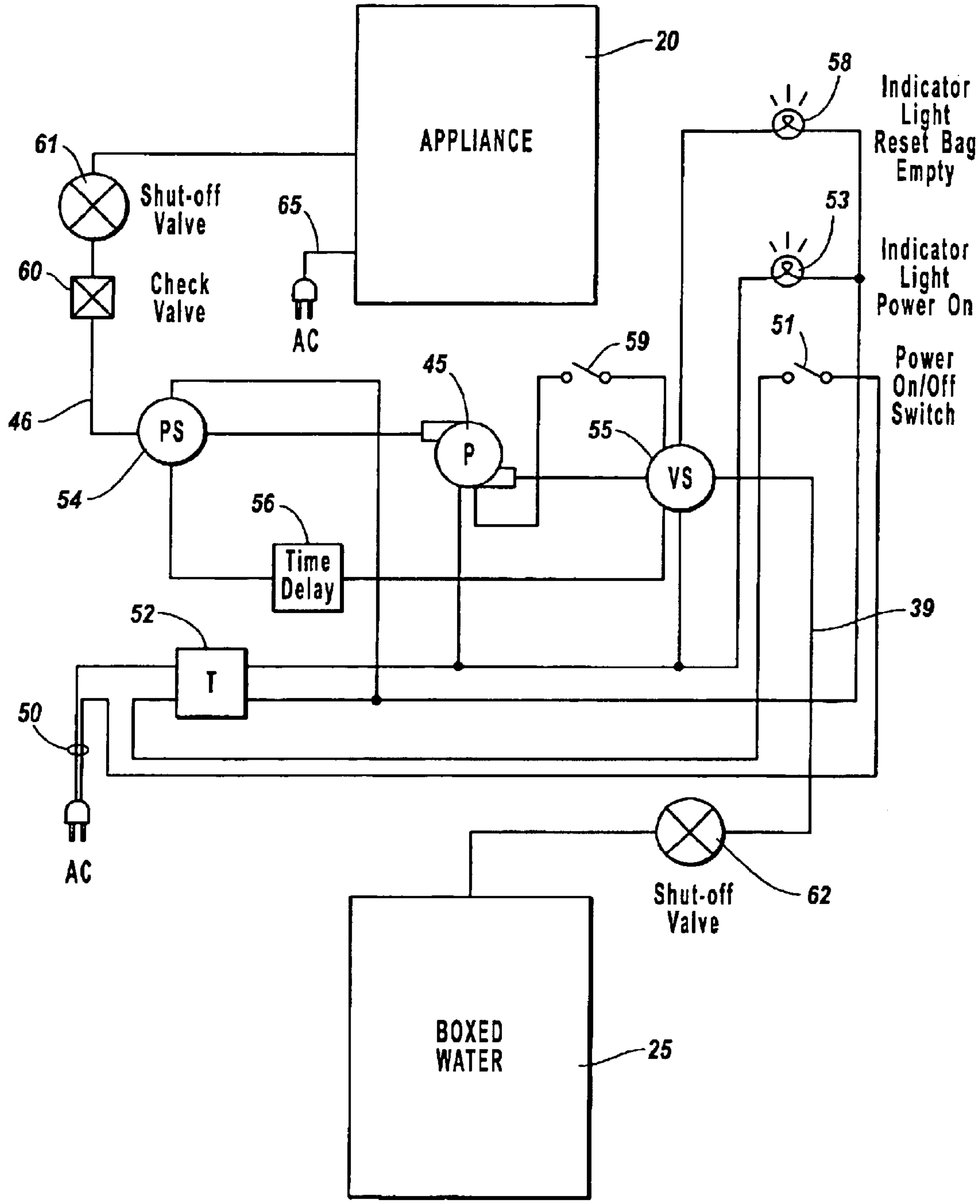

In the accompanying drawings, which show the best mode currently contemplated for carrying out the invention:

FIG. 1 is a front perspective view of a cart of the invention;

FIG. 2, a front right side perspective view of a second embodiment of a cart of the invention;

FIG. 3, a front right side perspective view of a third embodiment of a cart of the invention;

FIG. 4, a front right side perspective view of a fourth embodiment of a cart of the invention;

FIG. 5, a side elevation of the cart of FIG. 1;

FIG. 6, a front left side perspective view of a fifth embodiment of a cart of the invention;

FIG. 7, a front right side perspective view of a sixth embodiment of a cart of the invention;

FIG. 8, a perspective view of the top of a water container of the invention and a cap for connecting to the container showing the cap prior to connection to the container;

FIG. 9, a perspective view similar to that of FIG. 8, but showing the cap secured to the top of the container; and FIG. 10, a block diagram of the system components.

DETAILED DESCRIPTION OF THE ILLUSTRATED EMBODIMENTS

FIGS. 1 and 5 show a basic drink dispensing cart of the invention which uses a disposable water container of the invention. A cart 10 includes four legs 11, 12, 13, and 14 which support a cart top 15, a bottom shelf 16, and an intermediate shelf 17. Casters 18 are secured to the bottom of legs 11–14 so the cart 10 can be easily rolled to desired locations.

A water based drink machine 20 is positioned on top of cart top 15. Any of a variety of drink machines may be used as desired by the user. The drink machine 20 as shown is a single serve coffee, tea, and hot chocolate machine such as a Gevalia Model 6GM single serve coffee machine available in the United States from Newco Enterprises, Inc. of St. Charles, Md. This machine, as are similar water based drink dispensers, is designed to be connected directly to a municipal water supply pipe at the location of the machine. The machine is normally plumbed directly into the water supply pipe and is supplied on a continuous basis with pressurized water. The machine includes a reservoir which is filled with water from the water pipe and which has a control valve between the reservoir and the connection to the water pipe to control the flow of water from the pipe to the reservoir. The control valve is controlled by a water level sensor in the reservoir so that the valve is opened to allow water to flow into the reservoir when the reservoir is in need of water and to close when the reservoir is filled. The sensor and control valve may take the form of a mechanical float valve with the float being the level sensor, or the sensor and valve can be separate such as an electrical level sensor that produces a signal when the water level goes down with the signal operating a solenoid control valve. In operation of the machine, when first connected, the control valve is open and water flows from the supply pipe, through the valve, and into the reservoir to fill the reservoir. When full, the valve closes to stop the water flow. For hot drinks, the water in the reservoir is heated and maintained ready in heated condition. When a user desires a drink, the user places a cup in the cup locator 21, selects a desired cartridge from a cartridge supply located near the machine for the drink desired, i.e., a particular flavor coffee or tea or hot chocolate, and inserts the cartridge into the cartridge receiver 22, which starts operation of the machine. Hot water flows from the reservoir, through the cartridge, and into the cup. This process usually may take up to about thirty seconds. The user removes the cup and the machine is ready for insertion of a new cartridge which starts operation for a new drink. As the water goes down in the water reservoir, the control valve opens in response to the water level sensed, such as by the float, and water flows from the water pipe into the reservoir to again fill the reservoir. This is the normal operation of the drink machine. The Gevalia machine has a thirty cup reservoir and allows water to be manually added to the reservoir through a filling funnel accessible when opening the front cover of the machine. This allows limited operation of the machine when not connected directly to a water supply pipe A similar machine is the Keurig Model B2000 or Model 2003 Brewer available from Keurig Premium Coffee Systems of Wakefield, Mass.

In the current invention, the drink machine 20 is not plumbed into a water supply pipe. The cart includes a space for a water container, here the space is provided by bottom shelf 16. A water container 25, such as a bag-in-box container of water, is positioned on bottom shelf 16. Container 25 includes a flexible plastic bag 26, FIGS. 5, 8, and 9 positioned in a corrugated cardboard box 27 which holds, supports, and protects the bag 26. Bag 26 opens through a neck 28 and closure fitment 29 to opening 30 to allow water to be pumped from the bag. Closure fitment 29 includes opening 30, sealing flange 31 surrounding and defining opening 30, and flanges 32 and 33 adapted to receive and hold a sealing connector 35 in place over opening 30. A spiral ribbon 36 extends from neck 28 into bag 26 to prevent bag 26 from prematurely collapsing against neck 28 and sealing opening 30 before substantially all water is removed from bag 26. When bag 26 is initially filled with water, a plastic seal is secured across neck 28 to close and seal opening 30 to seal the bag. A cap is also preferably positioned over closure fitment 29 to protect and further seal opening 30. The neck, closure fitment, and spiral ribbon is as normally supplied by LIQUI-BOX Corporation of Worthington, Ohio, on bag-in-box soft drink syrups. The bag is also manufactured by LIQUI-BOX, but is specially formulated for drinking water.

With the bag-in-box water container shown, it has been found that a flexible copolymer material can be used for the bag and will not impart a plastic or other off flavor to the water. It is important with any water container used that the container does not impart an off flavor to the water. The water supplied in the containers for the system will generally be water which qualifies as bottled water under FDA standards and may be purified, drinking, distilled, or natural spring and/or mineral water. An advantage of the cart of the invention is that bottled water is used for the drinks rather than municipal water.

When water container 25 is positioned in its receiving space in cart 10, any protective cap over opening 30 and closure fitment 29 is removed and sealing connector 35, generally referred to as a quick connect disconnect connector, is positioned on closure fitment 29. As shown in FIGS. 8 and 9, sealing connector 35 includes a positioning and holding ring portion 37 adapted to fit and be held between flanges 32 and 33 to hold sealing connector 35 securely in place over opening 30. A piston 38 is in upward position when sealing connector 35 is to be secured to closure fitment 29 as shown in FIG. 8. When in place over opening 30, as shown in FIG. 9, piston 38 is pressed downwardly into neck 28 to break the plastic seal across neck 28 and communicate with the water in bag 26. Piston 38 connects water supply hose 39 to the water in bag 26 when in its down position. Fitting 40 with cap 41 extending from piston 38 opposite hose connection 42 allows the parallel connection of several water containers to water supply hose 39 when desired. Such parallel connection of water containers will increase the capacity of the machine between changes of the containers. The connector as shown is also supplied by LIQUI-BOX for use with bag-in-box soft drink syrups.

In order to supply water from the water container 25 to the drink machine 20, the system includes a pump and control circuitry to control operation of the pump. Intermediate shelf 17 provides a support for the pump and control circuitry. Referring to FIG. 5, water supply tube 39 extends from connector 35 connected to closure fitment 29 of the water container 25 to the inlet of a pump 45. Pump 45 may be any of a variety of pumps, with a diaphragm pump such as manufactured by Shurflo of Cypress, California, or Flojet of Foothill Ranch, California, having been found satisfactory. The output of pump 45 is connected through pipe or tube 46 to the pressure water input of drink machine 20.

Rather than operating pump 45 on a continuous basis, it is preferred to operate the pump 45 only when water is needed by drink machine 20. A control system shown in block diagram form in FIG. 10 controls operation of pump 45. Power to run pump 45 and the control circuitry comes from connection of power cord 50 to a usual 120 volt electrical outlet. Power from the outlet is connected through power on/off switch 51 to the primary winding of transformer 52. Transformer 52 reduces the voltage, such as to twelve or twenty four volts at the secondary. The transformer also includes a rectifier so that the output of the transformer is rectified and supplied as DC. Power on indicator light 53 is connected across the secondary so is illuminated when power is connected to the transformer. Light 53 may conveniently be located in switch 51, which may be a lighted rocker or push button switch mounted so as to be easily accessible on cart 10 as shown in FIG. 1. Power for pump 45 is supplied from the transformer secondary through pressure sensor 54 connected in line 46 extending from the output of pump 45 to the water inlet of drink machine 20, pressure sensor 55 connected in line 39 extending from water container 25 to the inlet of pump 45, and time delay circuit 56. Pressure sensor 54 is set to close and connect power through a set of contacts when the pressure sensed is below a preset pressure. Pressure sensor 55, in the form of a vacuum sensor, is set to open a set of contacts and disconnect power to pump 45 when a vacuum above a preset vacuum is sensed in line 39 and to simultaneously close another set of contacts to illuminate reset bag empty indicator light 58 at the same time. Also at the same time, bag empty reset switch 59 opens to disconnect power to pump 45 and remains open until it is manually closed to reset the control circuitry. Similarly to the power on switch 51 and power on indicator light 53, bag empty light 53 may conveniently be located in bag empty switch 59, which may also be a lighted rocker or push button switch mounted so as to be easily accessible on cart 10 as shown in FIG. 1. Rather than pressure sensor 55 being a vacuum sensor, pressure sensor 55 could be merely a low pressure sensor used with a zero or very low pressure indicating that the bag is empty. Some pressure remains in line 39 from the water container to the pump inlet even when the pump is not operating as long as water remains in the bag. It is only when the bag is empty and the pump is attempting to pump water from the empty bag that the pressure drops to zero and below to form the vacuum. Time delay circuit 56 is set to connect power to pump 45 after a preset time delay. The time delay circuit may provide an adjustable time delay that will usually be factory set to the preset value. The time delay circuit may be a standard circuit or a commercially available component well known to those skilled in the art.

In operation, with pump 45 operating to supply pressurized water from water container 25 to drink machine 20, water is supplied to drink machine 20 to fill up the machine's water reservoir. When the reservoir is full and the valve in the drink machine closes, water pressure builds up in line 46 with continued operation of pump 45 until the pressure reaches the preset value to open pressure sensor 54 contacts to disconnect power to pump 45. Pump 45 ceases operation and this condition remains until drink machine 20 is operated to use water to make a drink. When water is used, the valve in the drink machine opens to allow more water to flow into the drink machine reservoir. With the drink machine valve open, the pressure in line 46 decreases and when the pressure decreases to below the preset pressure of pressure sensor 54, pressure sensor 54 contacts close and power is supplied to time delay circuit 56. Time delay circuit 56 begins timing and at the end of the preset time delay, such as a thirty second time delay, connects power to pump 45 to begin operation of pump 45 to pump water to drink machine 20. Operation of pump 45 continues until the drink machine water reservoir is filled and the drink machine valve closes and again causes a pressure build up in line 46 which causes pressure sensor 54 to open and stop operation of pump 45. This operation continues to supply water when needed to drink machine 20. Time delay circuit 56 allows water to flow out of the drink machine reservoir so that when pump 45 turns on, it will be able to remain on to fill the drink machine reservoir. If operation of pump 45 begins immediately upon opening of the drink machine valve and drop of pressure in line 46, the drink machine reservoir is likely to immediately fill up even while water continues to be used to make a drink. This causes a rapid pulsing of the pump 45 on and off as the drink machine valve quickly opens and closes as water is supplied to the drink machine by pump 45 faster than the water is used by the machine in making a drink. The time delay allows the water reservoir to drain to the extent necessary to avoid this rapid pulsing of the pump.

When substantially all of the water in water container 25 is used, a low pressure condition and then a vacuum will build up in line 39 as the pump continues to try to pump water from the container. This vacuum is sensed by vacuum sensor 55 which shuts off pump 45 when a preset vacuum is sensed and operates the bag empty light 58 indicating to a user that the water container is empty and needs to be changed. Bag empty reset switch 59 is also opened. Upon changing of the water container 25, bag empty reset switch 59 is operated by the user and operation of the system resumes to again pump water to the drink machine. The water in the drink machine reservoir allows continued operation of the drink machine for a reasonable time to allow the empty water container to be discovered and changed.

The system preferably includes a check valve 60 in line 46 to prevent backflow of water in the line and a manual shut off valve 61 to close the line when desired if the machine is not going to be used for a period of time or the machine is being changed or removed. Also, a manual shut off valve 62 may be provided in line 39.

The drink machine 20 generally will need to be plugged into a source of power and will have a power cord 65, FIGS. 5 and 10, extending therefrom for that purpose. The power cord 65 can be plugged into a normal receptacle, or preferably, the cart will include one or more receptacles so the cord can be plugged into such receptacle. Power is supplied to the receptacles by power cord 50.

FIG. 2 shows a cart 69 similar to that of FIG. 1, but of different artistic design. FIG. 3 shows a similar cart 70 with an enclosure for the water container 25 having a door 71 providing access to the enclosure and water container 25 therein. FIG. 3, also shows a juice machine 72 rather than the coffee machine 20 as shown in FIGS. 1, 2, and 4–7. The juice machine 72 operates similarly to the coffee machine described in that it is intended to be connected directly to a pressurized source of water and includes an internal water reservoir with float valve to regulate flow of water into the reservoir. Such a juice machine is available as The Enterprise Model from Bevstar Inc. of Elk Grove Village, Ill. FIG. 4, shows a cart 75 similar to that of FIG. 1, but again of different artistic design and with an enclosure for the water container and a door providing access to the enclosure.

FIG. 6 shows a larger cart 80 having an enclosure with door 81 for the water container, an open intermediate shelf 82 for supplies, and a top surface 83 large enough for both the coffee machine 20 as previously described and a cartridge holding rack 84 with a selection of cartridges 85. The pump and control circuit is concealed in the cart to the right of the water container space in the enclosure.

FIG. 7, shows a combination water cooler and drink machine cart 90. The water cooler is built into and is an integral part of the cart. A standard water cooler that provides both cold and hot water as used with the currently standard five gallon water bottles includes two water reservoirs, one for cold water and one for hot water, a water cooling system, and a water heating system. Such coolers are also available for direct connection to a water pressure line as with the drink machines described. The water coolers for direct connection to a water pressure line include a control valve and level sensor as described for the drink machines for the cold water reservoir. Water flows from the cold water reservoir to the hot water reservoir so filling the cold water reservoir also fills the hot water reservoir. Such water coolers are available from Sunroc Corporation of Dover, Delaware as Models CCTPM-1C or CCLPM-1H. Similar water coolers are also available from Oasis Corporation of Columbus, Ohio as Model POUR1CTK. While these water cooler units could be used as they come from the factory by placing such units on the top of the cart of the invention in place of the drink machines shown, or on a special shelf of the cart, for the cart of FIG. 7, the water cooler unit is reconfigured and built into the cart in the position shown. This still allows a drink machine to be placed on top of the cart. The components of the water cooler remain the same, although reconfigured, and operation is the same. Operation of the water supply system of the cart is also the same, although the output of pump 45 is connected in parallel to the water inlets for the cooler reservoirs as well as to the water inlet of the drink machine 20.

As shown, the combination water cooler and drink machine cart 90 of FIG. 7 has both hot and cold water spigots 91 and 92 located in a recess 93 with a spilled water collection grate 94. A door 95 encloses water container 25 in an enclosed space 96 provided for the water container. The various water cooler components such as the hot and cold water reservoirs 97 and 98, the cooling system 99, and the heating system 101, all shown schematically as blocks in broken lines, are located behind the spigots as in the area 102, also indicated in broken lines. Area 102 is where the components of the standard cooler are relocated when reconfiguring the water cooler. The pump and control circuitry of the invention is located in the area 103 indicated in broken lines.

While several embodiments of the drink dispensing cart have been shown, it should be realized that various designs of carts can be used and that the designs of the carts from an appearance standpoint are not functional aspects of the invention. Also, the carts may be made with various dimension and may be sized to support more than one drink machine. A cart with a sixteen by nineteen inch top is generally satisfactory for holding one drink machine.

An advantage of the disposable water containers described is that since the containers are not refilled and recycled, they can be shipped by various means over long distances to customers outside the traditional market area for bottle water companies. This means that the water can be marketed through non traditional channels such as food stores and food service distributors, and discount, membership, and business stores. With this in mind, ease and economy of shipping becomes important. It has been found that if the boxes for the water containers are made nine and five eighths by nine and three eighths by fourteen and seven eights inches, the containers can each still hold five gallons of water and can be efficiently palletized and advantageously packed twenty boxes to a layer three layers high on a standard GMA pallet. This sizing is a feature of the invention, although the boxes could be of any desired dimensions for use with the cart of the invention.

The single use packaging is more sanitary and the boxes are closed over the necks with taping or with punch out portions of the box so that tampering with the containers is evident. The boxes include hand holds 100, FIG. 1, which makes handling of the containers easier. Also, the carts of the invention generally locate the boxes in the lower portion of the cart eliminating the need to lift and turn a five gallon bottle upside down as with traditional water coolers.

While the carts have been shown with the equipment thereon having power supply cords to be plugged into the normal power receptacles, the carts could be powered by batteries or generators for complete portability.

While the cart has been described as including a drink dispenser, the dispenser could merely be a dispenser of water and the water could be distilled or purified water for use in situations other than drink dispensing, such as in laboratories or medical facilities where distilled or purified water is needed.

Whereas the invention is here illustrated and described with reference to embodiments thereof presently contemplated as the best mode of carrying out the invention in actual practice, it is to be understood that various changes may be made in adapting the invention to different embodiments without departing from the broader inventive concepts disclosed herein and comprehended by the claims that follow.

I claim:

1. drink dispensing cart, comprising:

a cart that can be moved to desired locations;

a water based drink dispenser which requires a source of water connected thereto, said dispenser being mounted on the cart to move with the cart;

a space on the cart adapted to receive and removably hold a disposable bag-in-box container of water;

a pump having an inlet adapted to communicate with the bag-in-box container of water when the bag-in-box container of water is received in the space and an outlet communicating with the drink dispenser to pump water from the bag-in-box container to the drink dispenser;

an inlet fluid conduit to connect the inlet of the pump to the bag-in-box container of water when the bag-in-box container of water is received in the space;

a controller to control operation of the pump to cause the pump to supply water to the drink dispenser upon demand when the drink dispenser requires water;

wherein the controller includes a vacuum sensor in communication with the inlet conduit to sense vacuum in the inlet conduit; and wherein the controller stops operation of the pump when a vacuum is sensed.

2. A drink dispensing cart according to claim 1, wherein an outlet fluid conduit connects the outlet of the pump with a water inlet of the drink dispenser, and wherein the controller includes an outlet pressure sensor in communication with the outlet conduit to measure pressure in the outlet conduit, the controller stopping operation of the pump when the pressure sensed in the outlet conduit is above a preset value.

3. A drink dispensing cart according to claim 1, wherein the controller stops operation of the pump when the vacuum sensed is above a preset vacuum value.

4. A drink dispensing cart according to claim 1, wherein the cart additionally includes a cool water reservoir, a cooling system cooperable with the cool water reservoir to cool water in the cool water reservoir, and an outlet for dispensing cool water.

5. A drink dispensing cart according to claim 4, wherein the cart additionally includes a hot water reservoir, a heating system cooperable with the hot water reservoir to heat water in the hot water reservoir, and an outlet for dispensing hot water.

6. A drink dispensing cart according to claim 1, wherein the cart has a top surface and the water based drink dispenser is mounted on the top surface.

7. A drink dispensing cart according to claim 1, wherein the cart has a lower shelf and the space to receive the bag-in-box container of water is on the lower shelf.

8. A drink dispensing cart according to claim 1, additionally including the disposable bag-in-box container of water.

9. A drink dispensing cart according to claim 8, wherein the disposable bag-in-box container of water comprises:

a flexible bag made from a material that can hold water and does not impart a flavor to the water;

a closure; and a cardboard box sized to hold the bag when full of water enclosing the bag.

10. A drink dispensing cart according to claim 9, wherein the size of the cardboard box is nine and five eighths by nine and three eighths by fourteen and seven eighths inches.

11. A drink dispensing cart according to claim 1, wherein the controller includes a reset switch that is manually reset to begin operation of the pump after operation of the pump has been stopped in response to vacuum sensed by the vacuum sensor.

12. A drink dispensing cart, comprising:

a cart that can be moved to desired locations;

a water based drink dispenser which requires a source of water connected thereto, said dispenser being mounted on the cart to move with the cart;

a space on the cart adapted to receive and removably hold a container of water;

a pump having an inlet adapted to communicate with the container of water when the container of water is received in the space and an outlet communicating with the drink dispenser to pump water from the container to the drink dispenser;

a controller to control operation of the pump to cause the pump to supply water to the drink dispenser upon demand when the drink dispenser requires water;

an inlet fluid conduit to connect the inlet of the pump to the container of water when the container of water is received in the space;

an outlet fluid conduit to connect the outlet of the pump with the drink dispenser, and wherein the controller includes an outlet pressure sensor in communication with the outlet conduit to measure pressure in the outlet conduit, the controller stopping operation of the pump when the pressure sensed in the outlet conduit is above a preset value, said controller including a time delay circuit to prevent start up of the pump for a preset delay period once the pressure sensed in the outlet conduit drops below the preset value.

13. A drink dispensing cart according to claim 12, wherein the controller includes an inlet pressure sensor in communication with the inlet conduit to measure pressure in the inlet conduit, the controller stopping operation of the pump when the pressure sensed in the inlet conduit is below a preset value and providing an indication that the water container is empty.

14. A drink dispensing cart according to claim 13, wherein the inlet pressure sensor is a vacuum sensor and the controller stops operation of the pump when the vacuum sensed is above a preset vacuum value.

15. A drink dispensing cart according to claim 13, wherein the controller stops operation of the pump when the pressure sensed is substantially zero.

16. A drink dispensing cart according to claim 13, wherein the controller includes a reset switch that is manually reset to begin operation of the pump after operation of the pump has been stopped in response to pressure sensed by the inlet pressure sensor.

17. A drink dispensing cart according to claim 12, additionally including the container of water wherein the container of water is a disposable bag-in-box container.

18. A drink dispensing cart, comprising:

a cart that can be moved to desired locations;

a water based drink dispenser which requires a source of water connected thereto, said dispenser being mounted on the cart to move with the cart;

a space on the cart adapted to receive and removably hold a container of water;

a pump having an inlet adapted to communicate with the container of water when the container of water is received in the space and an outlet communicating with the drink dispenser to pump water from the container to the drink dispenser;

a controller to control operation of the pump to cause the pump to supply water to the drink dispenser upon demand when the drink dispenser requires water;

a cool water reservoir;

a cooling system cooperable with the cool water reservoir to cool water in the cool water reservoir;

an outlet for dispensing cool water;

a hot water reservoir;

a heating system cooperable with the hot water reservoir to heat water in the hot water reservoir;

an outlet for dispensing hot water;

wherein the cart has a height and a top surface;

wherein the water based drink dispenser is mounted on the top surface of the cart; and wherein the outlets for cool and hot water are positioned intermediate the height of the cart.

19. A drink dispensing cart according to claim 18, wherein the cart has a lower shelf and the space to receive the container of water is on the lower shelf.

20. A drink dispensing cart according to claim 18, additionally including the container of water wherein the container of water is a disposable bag-in-box container.

* * * * *